Jan. 26, 1954    J. W. J. ACKERMANS    2,667,113
VENTILATION SYSTEM FOR VEHICLE BODIES
Original Filed Jan. 18, 1947    4 Sheets-Sheet 1

INVENTOR.
John W. J. Ackermans
BY
McCrady & Wilson
Attorneys.

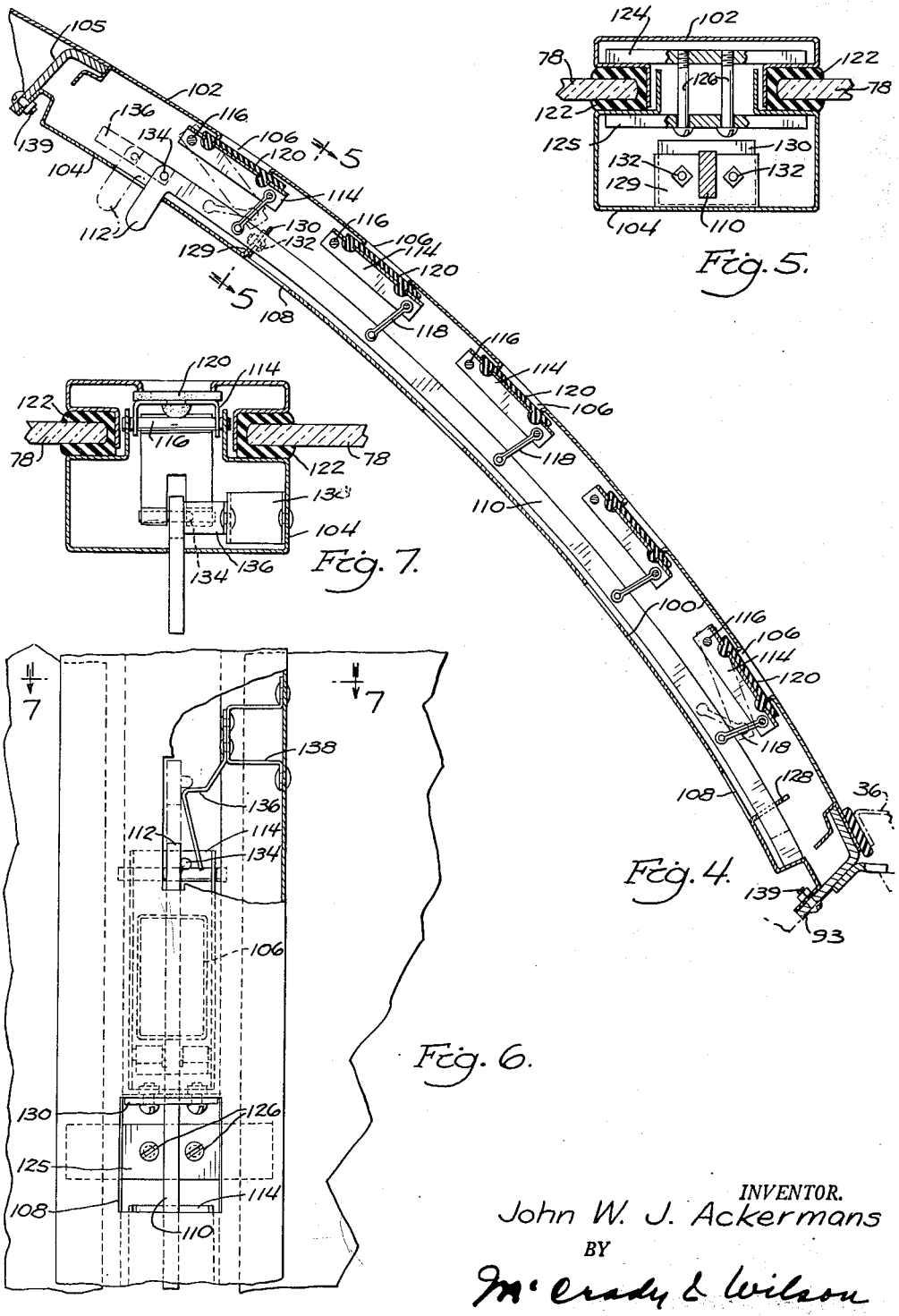

Jan. 26, 1954   J. W. J. ACKERMANS   2,667,113
VENTILATION SYSTEM FOR VEHICLE BODIES
Original Filed Jan. 18, 1947   4 Sheets-Sheet 3
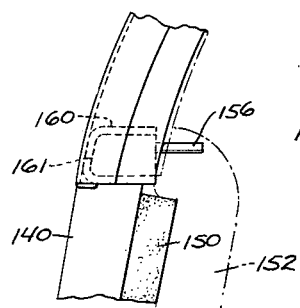
Fig. 9.
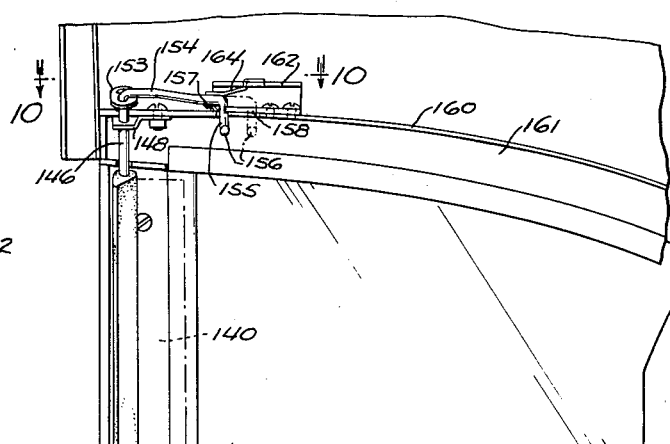
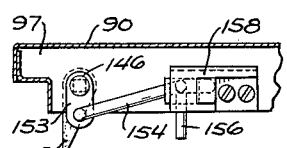
Fig. 10.
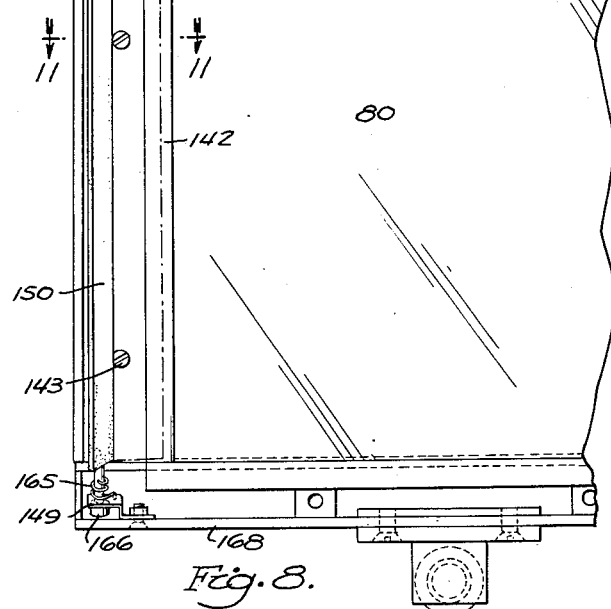
Fig. 8.
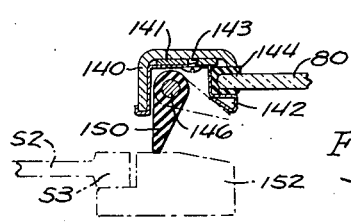
Fig. 11.
INVENTOR.
John W. J. Ackermans
BY
McCrady & Wilson
Attorneys.

INVENTOR.
John W. J. Ackermans
BY
Gregory S. Dolgoruков
Attorney

Patented Jan. 26, 1954

2,667,113

UNITED STATES PATENT OFFICE 2,667,113

VENTILATION SYSTEM FOR VEHICLE BODIES

John W. J. Ackermans, Detroit, Mich.

Original application January 18, 1947, Serial No. 722,859. Divided and this application July 3, 1950, Serial No. 171,819

5 Claims. (Cl. 98—2)

This invention relates to automobile body ventilation.

This application is a division of my copending application, Serial No. 722,859, filed January 18, 1947, for Convertible Vehicle Body, now Patent No. 2,596,355.

One object of the invention is the design of a practical ventilation system for an automobile body in which no windows have to be opened for ventilation.

Another object of the invention is to place the supporting pillar of the front section in line and on the inside of the upright pillar of the side window of the rear section, thus giving the appearance of one single pillar, from either the outside or the inside of the body, and have ventilation means between said pillars.

A further object is to leave clearance space between these two pillars that may be utilized as an air inlet by means of an adjustable weatherstrip that may be operated from either the front or the rear compartment independently of the windows, without having any protruding ventilator members either inside or outside to mar the appearance of the body or to impair the safety of the passengers.

Another object is an air intake in the upper side part of vehicle body, that may be used independently from systems now in use, and an air outlet in the upper back part of said vehicle body, the side intake to assist in forcing stale air out of the back outlet when the vehicle is in motion.

Yet another object is to provide a vent or outlet in a hollow pillar, in or near the center of the back portion of the rear top section, whereby stale and warm air may be drawn out of the body by the slipstream of the car, aided by the air pressure from the inlets between the side pillars or other inward air pressure means, and that may be closed at will from the inside of the vehicle without having any protruding louvers either inside or outside to mar the appearance of the body or to endanger the safety of its occupants.

Another object is to provide a ventilating pillar that allows opportunity to make provision for wide curved back windows, in the rear top section, which eliminate the blind spots in the corners and thus give better rear vision.

Further objects and advantages of the invention will be apparent from the following description, taken in connection with the appended drawings, in which:

Fig. 4 is a vertical view in detail of the ventilating pillar shown in Fig. 3.

Fig. 5 is a transverse sectional view of the same, taken on the line 5—5 of Fig. 4.

Fig. 6 is a fragmentary view in elevation of the pillar as viewed from the interior of the vehicle.

Fig. 7 is a sectional view taken on the line 7—7 of Fig. 6.

Fig. 8 is an enlarged detail in elevation of a portion of the rear top section as viewed from the interior of the vehicle.

Fig. 9 is an enlarged elevation of a detail, showing a portion of the structure of Fig. 8 as viewed from the left of the latter figure.

Fig. 10 is a horizontal sectional view taken on the line 10—10 of Fig. 8.

Fig. 11 is a horizontal sectional view taken on the line 11—11 of Fig. 8.

Figure 13:
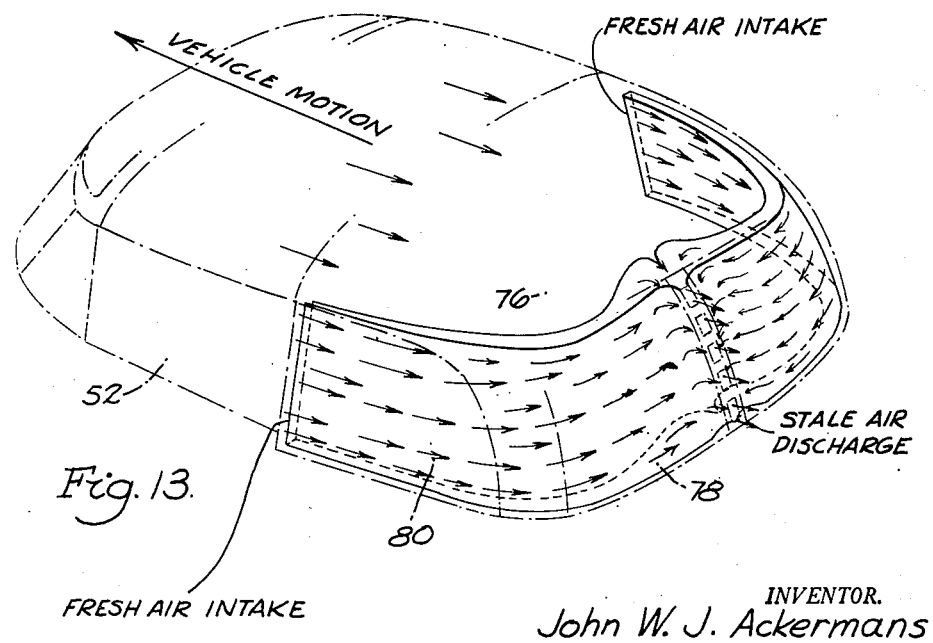

Fig. 13 is a diagrammatic perspective view showing the vertically extending sheets of air entering the body through vertically extending slits formed between the side window, and curving inwardly to come together and be exhausted through a vertically extended discharge member provided in the back window; the flow of air is shown in full lines, while pertinent portion of the vehicle structure is shown in dotted lines.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
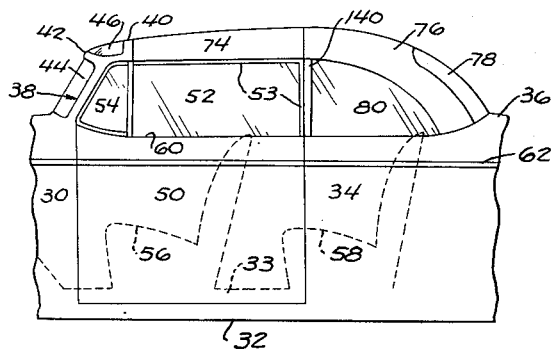
Fig. 1 is a diagrammatic view of a convertible automobile body embodying the present invention, showing the top in closed position.
Figure 2:
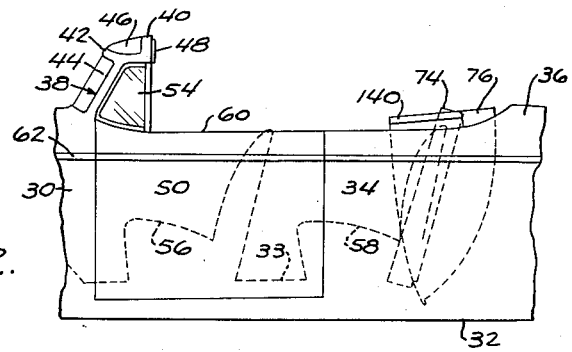
Fig. 2 is a similar view showing both top sections lowered into the booth.

As will be seen in Figs. 1 and 2, the automobile body is of the two-door type and comprises a cowl 30, a sill 32, a floor 33, and a rear side panel 34, all of these parts being stationary elements of the body. At the rear of the passenger compartment is a deck panel 36, which with the usual deck lid 37 (Fig. 3) forms a cover for the luggage compartment of the car.

Secured to the cowl 30 is a windshield assembly comprising a frame 38, which includes a transverse bow 40 and a header 42. The frame is designed to retain the conventional windshield 44 and one or two curved glass panes 46 which in effect form transparent panels in the roof of the vehicle. The bow 40 is rabbeted at its rear surface to form a rearwardly extending flange 48 (Fig. 2), which receives the forward edge of the front top section.

This rearwardly extending windshield assembly permits the shortening of the two top sections and prevents both sections, when in the booth, from extending too far above the body belt line and thus obstructing rear vision.

The body is provided at each side with a door 50, hinged at its forward edge and carrying a window pane 52 having a frame 53, and vertically movable by any suitable actuating mechanism. Forward of the pane 52 is a smaller pane 54 which is rotatable about a vertical axis for ventilation in the known manner. The vehicle is also provided with a conventional front seat 56, and with a rear seat 58 which is positioned forwardly and inwardly of the panels 36 and 34 by a sufficient distance to provide a space or berth to receive the two top sections as hereinafter described. The upper edge of door 50 and the upper edges of the rear panel 34 and of the deck panel 36 form a continuous line 60 which is herein referred to as the body belt line. A horizontal external belt molding 62 extends throughout the greater portion of the length of the body.

The movable front top section is indicated at 74, and the movable rear top section or balloon is indicated at 76, Fig. 1. The latter section comprises a pair of window panes 78 to permit rear vision, and is provided with side windows 80 which are fixed relative to the remainder of the rear top section.

The rear top section is formed at either side with a vertical pillar 140 of channel shape, Figs. 8–11, and a molding 142 is mounted within the pillar by means of screws 143 threaded into a tapping plate 141. The molding 142 serves to retain a rubber mounting 144 for the window pane 80. A vertical rod 146 extends longitudinally within the channel 140, its upper and lower ends being pivotally secured in guide plates 148, 149, as shown in Fig. 8. To the rod 146 is secured a ventilating weatherstrip or louver 150 of rubber or the like material which, in the position of the parts shown in Fig. 11, extends inwardly to contact the inner pillar 152 of the front top section, the pillar 152 being laterally aligned with the pillar 140 so as to give the appearance of a single pillar when the top is completely closed. By means hereinafter described, the ventilating weatherstrip 150 may be rotated to the dotted line position shown in Fig. 11, in which position it permits the entry of air between the pillars 140 and 152, the air passing rearwardly from this opening and out through the apertures 108 and 106 at the rear of the passenger compartment.

The upper end of the rod 146 is squared to engage in a squared hole in a lever arm 153 (Fig. 10), which is secured to the rod 146 as by riveting the material of the rod after the weatherstrip 150 and guide plates 148, 149 have been mounted on the rod. A push rod 154 has its forward bent end pivotally engaged in an aperture at the projecting end of lever arm 153, its rear portion being bent downwardly to form a vertical portion 155, and then inwardly to form a handle 156. In order to retain the weatherstrip 150 in its closed position, a boss 157 is formed on the lower surface of the push rod 154, to engage the forward edge of a slotted plate 158 which is secured to a flange 160 formed on the upper edge of a channel shaped frame member 161. The plate 158 is preferably formed as the lower leg of a channel member, the upper leg 162 of which is apertured to retain a leaf spring 164. The free end of spring 164 presses downwardly against the push rod 154 to prevent rattling and to retain the boss 157 in yielding engagement with the front edge of the plate 158. At the bottom of the rod 146 is mounted a coil spring 165, the same being stressed to exert a torsional force upon the rod tending to move the ventilating weatherstrip 150 to its open position. One end of the spring 165 is secured to the guide plate 149, while the other end of the spring is secured in a hole in the rod 146. The lower end of rod 146 is formed with an enlarged head 166 which rests upon the horizontal arm of a contoured channel-shaped rail 168 which forms part of the frame of the window pane 80.

In order to open the ventilating weatherstrip or louver 150, the user will raise handle 156 sufficiently to disengage boss 157 from the front edge of plate 158, whereupon the spring 165 will rotate the weatherstrip to open position, moving the push rod 154 from the full line to the dotted line position shown in Fig. 8. To close the weatherstrip, the handle 156 will be moved forwardly until boss 157 engages the front edge of plate 158, which will retain the weatherstrip in closed position.

The two window panes 78 in the back of the rear top section are separated by a hollow pillar 100 (Figs. 3 and 4), which extends along the median plane of the vehicle and is made up of an outer rib 102 and an inner rib 104, the same being attached at their upper ends to a frame member 105 and at their lower ends to the rear rail 93. The outer rib 102 is formed with ventilating apertures 106, and the inner rib 104 is formed with corresponding apertures 108 staggered vertically with respect to the apertures 106, the purpose being to cause the partial vacuum created by the slipstream of the vehicle in motion to draw out through these ventilating apertures the rising stale or warm air within the passenger compartment, assisted by the forced-in air of the side intakes.

Figure 3:
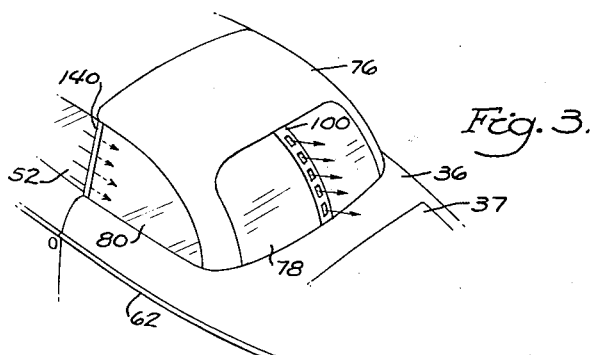
Fig. 3 is a diagrammatic view in perspective, showing the rear portion of the top.
Figure 12:
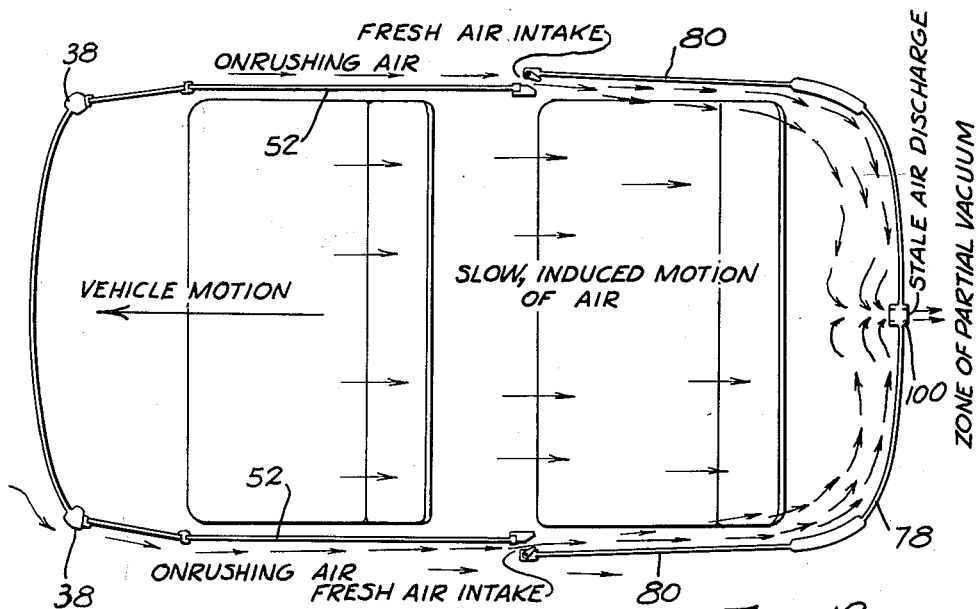
Fig. 12 is a diagrammatic plan view illustrating the flow of air within the vehicle body, said flow being shown in perspective in Fig. 3.

Thus, as can be clearly seen from an examination of Figs. 3, 12 and 13, the ventilation effected within the enclosure of the vehicle body in accordance with the present invention is based on creating flow of thin vertically extending layers or sheets of air entering the body behind driver's seat and produced by the airscooping slits between the front side window and rear side window of the automobile body. Because of the construction illustrated in the drawing, such vertically extending layers of air are created on both sides of the vehicle and they flow rearwardly of the vehicle along the inner surfaces of the rear side windows and without creating cross-currents or draft currents that would impinge on occupants and particularly on driver's head and neck. The layers of moving air so created move rearwardly of the vehicle and curve around the rounded corners of the body to converge in front of the back window, i. e., in locality where the air discharge member 100 is provided. See Figs. 12 and 13.

In view of the fact that during the forward motion of the vehicle partial vacuum is created behind the vehicle body in the region immediately adjacent the discharge member 100, if the vent apertures provided in said member are opened, partial vacuum will also be created inside of the body in front of the member 100. Moreover, since immediately in front of such region of vacuum within the body, the meeting of the two sheets of air takes place and increase of pressure takes place, a very active flow of air through the member 100 outwardly of the vehicle is created.

Referring to Fig. 1, it will be seen that due to the inclination of the back window 78, there is provided a certain space immediately in front of the back window 78 and behind the back seat, wherein such motion of air takes place without causing inconvenience even to the occupants of the back seat.

It will be understood that such flow of air under certain conditions may tend to be greater than the flow of air through the air-scooping slits, whereby additional general flow of air of relatively low velocity is induced within the body, generally in the rearward direction, thus carrying and exhausting tobacco smoke, air exhausted by the occupants of the body as well as engine fumes which may penetrate the body through the heater or through cracks or holes in the lower portion of the body.

It will be further understood that such ventilation is substantially draftless since the strong streams of air are not in the form of thick solid streams such as may be produced by turning front window flaps and directing the air toward the middle lower portion of the driver's seat, or by opening any of the side windows and causing strong horizontally extending layers of inrushing air entering the vehicle body and whirling around therein.

For the purpose of opening and closing the apertures 106 when desired, a control rod 110 is slidably mounted within the rib 104, and is formed with an angular extension 112 which projects through a slot in the rib 104 to form a handle within the reach of the occupants of the passenger compartment. A baffle plate 114 is mounted adjacent each of the apertures 106. Each of the plates 114 is pivoted adjacent its upper edge on a pin 116 mounted in the inner rib 104, and its lower edge is connected by means of a link 118 to the rod 110. Each baffle plate 114 is provided with a cover 120, of rubber or like material, which yieldingly engages the inturned edges of the ventilating aperture 106. The cover 120 may be secured to plate 114 by pressing a portion of the material through apertures in the plate 114, as indicated in Fig. 4. With the arrangement just described, the ventilating apertures 106 may be opened by pushing the handle 112 upwardly to the position shown in dotted lines in Fig. 4, causing the links 118 to open the plates as indicated in dotted lines in the same figure. As will be seen in Figs. 5 and 7, the ribs 102 and 104 are formed with infolded and overlapping edges to provide opposed grooves in which are mounted grooved strips 122 of rubber or the like to receive the edges of the rear window panes 78. The two ribs are held together by means of plates 124 and 125 which are separably secured together by means of machine screws 126. The control rod 110 is guided in slots formed in flanges 128, 129, the flanges themselves being formed from the metal which is removed in forming the ventilating apertures 106. In order to permit assembling, the upper flange 129 is cut off, and a plate 130 is detachably secured thereto by means of bolts 132 after the rod 110 has been inserted through the slot in the lower flange 128. In order to hold the rod 110 in its upper position and thus retain the plates 114 in their open position, the handle 112 is provided with a pin or boss 134 which is positioned to engage and deflect an angular leaf spring 136 as the handle is moved upwardly, and finally to engage a shoulder on said spring to be retained in uppermost position until forced downwardly by the operator. The spring 136 is mounted on a bracket 138 secured to the side wall of the inner rib 104.

In assembling, the outer rib 102 may first be permanently secured to the rear rail 93 and the frame member 105, and after the back windows 78 have been installed the inner rib 104 with its associated baffles and other elements may be installed as a unit and held in place by means of screws, 126, access to the screws being had through the inner ventilating apertures 108. The screws 126 when fixed in position in the plates 124 and 125 securely retain the two ribs together. The inner rib 104 may then be secured to the rail 93 and the frame member 105 by means of bolts 139.

The two rigid top sections may be moved from the raised position shown in Fig. 1 to the lowered position shown in Fig. 2, and vice versa, by power mechanism disclosed in my copending application Serial No. 722,859, above identified.

Although the invention has been described with reference to a particular embodiment thereof, it may be embodied in other forms within the skill of artisans in this art, and is not limited except in accordance with the terms of the following claims.

I claim:

1. In a closed vehicle body having a front seat, two sides each including a front side window and a rear side window, said front and rear side windows having their adjacent vertically extending edges overlapping each other and disposed behind said front seat, the rear side window being offset outwardly to have its front edge disposed outwardly from the adjacent rear edge of the front side window to form an air-scooping slit extending through substantially the entire height of said windows and adapted when the vehicle is in motion to entrap the inrushing air and to produce a vertically extending sheet of air moving within the body in the rearward direction along the inner surface of the rear side window, and shutter means including an elongated member of rubber-like material operatively arranged along said air-scooping slit, said shutter means being operable from within said body to close and to open said air-scooping slit.

2. In a closed vehicle body having a front seat and a back window at the rear of the body with the inner rear corner of the body being curved, two sides each including a front side window and a rear side window, said front and rear side windows at each of said two sides having their adjacent vertically extending edges overlapping each other and disposed behind said front seat, the rear side window being offset outwardly to have its front edge disposed outwardly from the adjacent rear edge of the front side window to form an air-scooping slit extending through substantially the entire height of said windows, shutter means operable from within said body to close and to open said air-scooping slit, the air-scooping slit at each of the two sides of the body being adapted when the vehicle is in motion to entrap the inrushing air and to produce within the body a vertically extending sheet of air moving rearwardly along the side of the vehicle and curving along said inner corner, with such sheets of air from the sides of the body meeting in front of the back window, a discharge member provided in said back window, said discharge member extending substantially through the entire height of said back window and having vents adapted to discharge air rearwardly of the vehicle into the region where partial vacuum is created during forward motion of the vehicle; and second shutter means operable from within said body and adapted to close sealingly and to open said vents.

3. The construction defined in claim 2, the shutter means for the air-scooping slits and for the back window being operable manually and independently of each other.

4. In a closed vehicle body having a back window opening, a plurality of window panes fitted into said opening to leave between them at least one slot extending substantially through the entire height of the window opening, a hollow air-discharge member adapted to close said slot and comprising an outer portion and an inner portion removable from said outer portion, sealing means between said member and said panes, a plurality of vent apertures in each of said outer and inner portions adapted to discharge air from the interior of the body rearwardly of the vehicle, shutter means carried by said inner portion and including a corresponding plurality of hinged closures adapted to close sealingly the vent apertures in said outer portion, and a control rod mounted within said inner portion and connected to said closures for operating the same simultaneously, said control rod being operable from within the body.

5. A ventilating discharge member for a vehicle body, said member installable in the back window opening of a vehicle body and comprising an outer portion and an inner portion separable from each other to form a hollow member, said outer and inner portions being provided with ventilating apertures adapted to discharge the air rearwardly of the vehicle, and said inner portion carrying a plurality of closures pivotedly mounted thereon and adapted to close sealingly and to open the ventilating apertures in said outer portion, and a control rod mounted within said inner portion and operable from within the body, said control rod hingedly connected to said closures and adapted to operate the same to close sealingly said ventilating apertures in said outer portion and to open the same.

JOHN W. J. ACKERMANS.

References Cited in the file of this patent

UNITED STATES PATENTS

| Number | Name | Date |
|---|---|---|
| 1,607,109 | Wieser | Nov. 16, 1926 |
| 1,635,609 | Crawford | July 12, 1927 |
| 1,846,552 | Haskins | Feb. 23, 1932 |
| 1,918,630 | Bombard et al. | July 18, 1933 |
| 1,980,039 | Crowell | Nov. 6, 1934 |
| 1,985,538 | Fergueson | Dec. 25, 1934 |
| 2,039,403 | Gillette | May 5, 1936 |
| 2,045,578 | Buford | June 30, 1936 |
| 2,223,709 | Wickstrom et al. | Dec. 3, 1940 |
| 2,241,147 | Maier | May 6, 1941 |
| 2,302,202 | Freydl | Nov. 17, 1942 |
| 2,463,715 | Randall | Mar. 8, 1949 |

FOREIGN PATENTS

| Number | Country | Date |
|---|---|---|
| 377,636 | Great Britain | July 28, 1932 |
| 515,343 | Great Britain | Dec. 1, 1939 |
| 651,703 | Germany | Oct. 18, 1937 |